United States Patent [19]

Thomson

[11] 4,036,790

[45] July 19, 1977

[54] POLYURETHANE FOAM COMPOSITIONS

[75] Inventor: Francis D. Thomson, Newark, Ohio

[73] Assignee: Owens-Corning Fiberglas Corporation, Toledo, Ohio

[21] Appl. No.: 575,897

[22] Filed: May 8, 1975

[51] Int. Cl.$^2$ .................. C08G 14/08; C08G 18/28
[52] U.S. Cl. ................... 260/2.5 AQ; 260/51.5; 260/59 R; 260/59 EP
[58] Field of Search ............... 260/51.5, 59 EP, 59 R, 260/2.5 AQ

[56] References Cited

U.S. PATENT DOCUMENTS

| 2,315,087 | 3/1943 | Cuvier | 260/51.5 |
| 3,076,772 | 2/1963 | Christ | 260/51.5 |
| 3,277,027 | 10/1966 | Hennig et al. | 260/2.5 AQ |
| 3,567,801 | 3/1971 | Stamm et al. | 260/2.5 AQ |
| 3,632,531 | 1/1972 | Rush et al. | 260/59 R |
| 3,770,671 | 11/1973 | McFarling | 260/59 R |
| 3,911,046 | 10/1975 | Ackermann et al. | 260/51.5 |
| 3,943,077 | 3/1976 | Bell et al. | 260/2.5 AQ |

*Primary Examiner*—Donald E. Czaja
*Assistant Examiner*—H. H. Fletcher
*Attorney, Agent, or Firm*—John W. Overman; Patrick P. Pacella

[57] ABSTRACT

Rigid polyurethane foams are disclosed which comprise urea-modified resole-based polyols.

12 Claims, No Drawings

POLYURETHANE FOAM COMPOSITIONS

This invention relates to polyurethane foam compositions. More specifically, this invention relates to improved cellular or foamed polyurethane plastics which comprise urea-modified resole-based polyols.

Foamed polyurethane plastics are generally prepared by the reaction of a polyisocyanate and a polyhydroxylated compound (polyol) in the presence of a blowing agent and a catalyst. The principal reaction involved is that which occurs between the polyisocyanate and the polyol to yield a polyurethane polymer.

Polyurethane foam compositions have found wide and varied use in industry. The foam-forms of polyurethanes have been particularly significant. Flexible foams have been widely employed in mattresses, cushions, and wherever resiliency and long life are necessary factors. Rigid foams have many desirable uses due to their high structural strength coupled with their low density. Sandwich-type constructions employing rigid foams as a filler exhibit high rigidity, a property desirable for building purposes. Rigid foams are also excellent vibration dampers and thus may support high resonant loads. In addition, because of their small grain cell structure, rigid foams are excellent sound and heat insulators.

Because of the many advantages offered by polyurethane foam compositions, industry is constantly searching for lower costing components for use in these compositions.

I have now discovered new and useful urea-modified resole-based polyols which comprise alkylene oxide adducts of phenol-urea-aldehyde condensates. These polyols are produced in two steps. First, the phenol, urea and aldehyde are reacted in the presence of a catalyst to produce a resole. Second, the resole is oxyalkylated to form a polyol of my invention.

The urea-modified resole-based polyols provided by my invention are highly useful in the production of polyurethane foams. These polyols enable one to substitute urea for phenol in the polyol structure. Accordingly, the urethane industry can still produce my polyols even during times when phenol is in short supply.

The resole of my invention is formed by the condensation reaction of aldehyde with phenol and urea in the presence of an alkaline catalyst. The amounts of aldehyde and urea to be condensed with the phenol can be changed in order to prepare resoles of various molecular weights thus effecting the viscosity of the resulting resoles. Preferably, the amount of aldehyde employed is from about 1.5 to about 8 moles of aldehyde per mole of phenol. Preferably, the amount of urea is present from about 0.1 to about 1.0 mole of urea per mole of phenol. The resoles of my invention comprise a mixture of monomeric and polymeric methylol phenols, methylol ureas, and methylol urea phenols.

In order to form a polyol of my invention, I react the above resole with at least one alkylene oxide in the presence of an alkaline catalyst. The resole reacts with the alkylene oxide such that alkyleneoxy radicals are reacted into the resole structure. After oxyalkylation, the resulting product is recoverable as a urea-modified resole-based polyol.

Phenols which can be used in preparing the urea-modified resoles for use in my invention include all suitable phenols or phenol derivatives. Suitable phenol derivatives include all aliphatic phenol derivatives of the general formula:

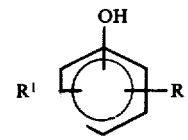

wherein R is positioned in the ortho, meta, or para position relative to the hydroxyl radical and is hydrogen, a halogen or an alkyl radical containing from 1 to about 18 carbon atoms; and $R^1$ is either the same as R or another member of the above group positioned in any of the vacant positions.

In preparing the urea-modified resoles, any suitable aldehyde capable of reacting with phenol and urea, and having not more than eight carbon atoms can be employed. The preferred aldehyde is formaldehyde which can be in aqueous solution or in a low polymeric form such as paraformaldehyde. Other suitable aldehydes include acetaldehyde, propionaldehyde, butyraldehyde, benzaldehyde, furfural, 2-ethylhexanal, ethylbutyraldehyde, heptaldehyde, pentaerythrose, and glyoxal. In the Examples of my invention, a 52% formaldehyde in water solution was used.

In the resoles of my invention, melamine can be substituted for urea. I also can substitute dicyandiamide for urea.

Any suitable alkaline catalyst can be employed with the urea, phenol and aldehyde to form a urea-modified resole. Alkaline catalysts that can be used include alkali or alkaline earth hydroxides, primary amines, secondary amines, tertiary amines, or basic alkali salts. Suitable catalysts are sodium hydroxide, potassium hydroxide, lithium hydroxide, calcium hydroxide, barium hydroxide, methyl amine, dimethyl amine, diethyl amine, trimethyl amine, tripropyl amine, dimethyl benzyl amine, and dimethyl-2-hydroxypropyl amine. A particularly suitable alkaline catalyst is trimethylamine.

The preferred method of oxyalkylation is by the reaction of the urea-modified resole with an alkylene oxide in the presence of an alkaline catalyst. Examples of alkylene oxides suitable for use include ethylene oxide, propylene oxide, butylene oxide and isobutylene oxide. In my invention, the amount of alkylene oxide used is from about 3 to about 20 moles of alkylene oxide per mole of phenol in the resole.

The catalyst used for the reaction of the alkylene oxide with the resole can be the same catalyst that is used for the resole formation. It has been found that if the catalyst used in the resole formation is added in excess of the amount necessary for resole formation, the residual catalyst will suffice to catalyze the oxyalkylation reaction. If the same catalyst is used for both the resole formation and the oxyalkylation reaction, the amount of catalyst initially added during the resole formation should be present in an amount of from about 0.01 to about 0.1 mole of catalyst per mole of phenol. If it is desired to catalyze each reaction separately, the total amount of catalysts should be present in equal amounts in a total amount of from about 0.01 to about 0.1 mole of catalysts per mole of phenol.

Preferably, the urea-modified resole-based polyols of this invention will be employed in a composition comprising an organic polyisocyanate or a prepolymer, at least one additional polyol, a blowing agent, at least one crosslinking agent, a catalyst, a surfactant and water. The term "resin mixture" will be understood to include all of the above polyurethane components except the organic polyisocyanate or prepolymer.

A urea-modified resole-based polyol of my invention can be employed as the only polyol in any suitable polyurethane foam composition. Generally, however, I employ at least one other polyol with the polyol of my inventin in order to improve handling and flame properties of the resulting foams. If the polyol of my invention is employed alone, it is present in an amount of from about 60 to about 90 parts per 100 parts of the resin mixture.

In one embodiment, two additional polyols, a second and a third polyol, are employed with a urea-modified resole-based polyol of my invention.

Any suitable polyol can be employed as a second polyol in my invention. Suitable second polyols include Thanol R-350-X, an aromatic amino polyol which has a hydroxyl number of about 525 and is commercially available from Jefferson Chemical Company Inc., and Niax Polyol BE-375, an aromatic polyether polyol with a relatively low hydroxyl number of about 375 commercially available from Union Carbide Corporation.

The second polyol employed in my invention will be present in an amount within the range of from about 20 to about 50 parts per 100 parts of the resin mixture. It is preferred that a urea-modified resole-based polyol of my invention and this second polyol be present in a total amount of from about 60 to about 75 parts per 100 parts of the resin mixture.

Any suitable fire retardant polyol can be employed as the third polyol. A particularly suitable polyol is Fyrol 6, a phosphonate ester having the following structure:

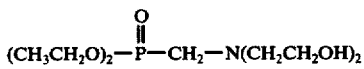

Fyrol 6 is commercially available from Stauffer Chemical Company.

The third polyol employed in my invention will be present in an amount within the range of from about 1 to about 10 parts per 100 parts of the resin mixture.

Any suitable organic polyisocyanate can be used to form a polyurethane foam composition of my invention. The organic polyisocyanate should be present in an amount such that the total —NCO equivalent to total polyol active hydrogen equivalent is greater than one. Preferably, the —NCO/—OH index is from about 1.05 to about 1.2 parts —NCO per 1 part of —OH.

Suitable isocyanates or reactive —NCO containing compounds which can be employed in practicing this invention include 2,4-tolylene diisocyanate; 2,6-tolylene diisocyanate; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate; 3,3'-dimethyl-4,4'-biphenylene diisocyanate; 1-methoxy phenylene-2,4-diisocyanate; diphenylene-4,4'-diisocyanate; 4,4'-diisocyanate diphenyl ether; naphthylene-1,5-diisocyanate; diisocyanate-diclyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3-methyl-4,6,4'-triisocyanate diphenyl methane; 2,4,4'-triisocyanate diphenyl; 2,4,4'-triisocyanate diphenyl ether; long chain hydrocarbons and substituted hydrocarbons terminated with —NCO radicals and mixtures thereof. Prepolymers having reactive isocyanate or —NCO groups may also be used.

A particularly suitable prepolymer for use in my invention is A-100 which has a hydroxyl number of about 358 ± 10 and is commercially available from Owens-Corning Fiberglas. A-100 is a prepolymer prepared by reacting a polymeric isocyanate, such as methylenediisocyanate, with a phosphorus containing diol to give a —NCO content of 26.85% and then adding one part of a surfactant per 100 parts of the resin mixture. A particularly suitable surfactant used with A-100 is DC 195. DC 195 surfactant is a combination of dimethyl silicone and an adduct of ethylene oxide and propylene oxide and is commercially available from Dow Corning Corporation.

If either a prepolymer or an isocyanate is employed in my invention, the amount of surfactant employed is from about 0.3 to about 3 parts per 100 parts of the resin mixture. A particularly suitable surfactant for use with an isocyanate is DC 193. DC 193 surfactant is a combination of dimethyl silicone and an adduct of ethylene oxide and propylene oxide where the adduct is hydroxyl terminated. DC 193 is commercially available from Dow Corning Corporation.

When the polyols of this invention and an isocyanate or prepolymer are foamed, any blowing agent commonly used in the art can be employed. Suitable liquids are the fluorochlorocarbons boiling in the range of twenty to fifty degrees Centigrade, and mixtures thereof, for example, trichlorofluoromethane, trichlorotrifluoroethane, dichloromonofluoromethane, monochloroethane, monochloromonofluoroethane, difluoromonochloroethane, and difluorodichloroethane. The blowing agent will comprise from about 10 to about 30 parts per 100 parts of the resin mixture. A particularly suitable blowing agent is F-11B, a freon, commercially available from Union Carbide Corporation.

Suitable crosslinking agents include most low viscosity high hydroxyl number materials. Particularly suitable crosslinking agents are propylene glycol and triethanolamine. A mixture of several crosslinking agents can be employed. The total amount of crosslinking agents employed is within the range of from about 1 to about 10 parts per 100 parts of the resin mixture.

Any suitable catalyst can be used to increase the rate of the isocyanate-polyol reaction. Particularly suitable catalysts include trimethylamine, triethylamine, and dimethylethylamine. Preferably, the amount of catalyst employed is within the range of from about 0.6 to about 1.2 parts per 100 parts of the resin mixture.

Water may or may not be added to the polyurethane foam composition. If water is employed it serves to add crosslinking density to the foam, making it more dimensionally stable. Preferably, water is employed in an amount up to about 0.75 part per 100 parts of the resin mixture.

The following examples illustrate the preparation of a urea-modified resole-based polyol, and the preparation of a polyurethane foam composition in which it is employed.

EXAMPLE I

This example demonstrates the best mode of preparing a urea-modified resole-based polyol of my invention.

| Ingredients | Moles |
| --- | --- |
| Phenol | 1 |
| Formaldehyde in 52% water solution | 4 |
| Urea | 0.3 |
| Triethylamine | 0.1 |
| Propylene Oxide | 5.7 |

The 0.3 mole of urea was put in a reactor, and the reactor temperature control was set at 100° F. The 4 moles of formaldehyde solution were added and then the mole of phenol was added. Next 0.1 mole of triethylamine was added, the temperature control was set for 150° F and the reactor contents were stirred. Heating at 150° F was continued until about a 4.5% free formaldehyde reading was obtained (approximately 4 to 5 hours). Upon obtaining a 4.5% free formaldehyde reading, the reactor was cooled to 125° F and set for vacuum strip of the excess water. The vacuum strip was continued until the water content was about 5.5 ± 2%. The reactor temperature was again set at 150° F and the 5.7 moles of propylene oxide were added to the reactor over a period of 6 hours in order to avoid excessive build up of propylene oxide in the reactor. After the addition of all of the propylene oxide was complete and the pressure in the reactor had decreased, the temperature was raised to 185° F and maintained for 2 hours. The temperature was again raised this time to 215° F and the mixture was cooked for an additional 2 hours. The reactor was again set up for vacuum strip and the mixture was stripped at 225° F until no condensate came over. The mixture was permitted to cool to 170° F and the resulting product was recovered as a resole-based polyol of this invention and found to have a molecular weight of about 900 and a hydroxyl number of 475 ± 25.

EXAMPLE II

This example demonstrates the incorporation of the urea-modified resole-based polyol of Example I into a polyurethane foam composition which employs a prepolymer.

| Ingredients | Parts per 100 Parts |
| --- | --- |
| Polyol of Example I | 30 |
| BE-375 "Niax" Polyol | 35 |
| Fyrol 6 Polyol | 5 |
| Propylene glycol | 2.0 |
| Triethanolamine | 3.0 |
| F-11B | 23.75 |
| Dimethylethylamine | 0.83 |
| H$_2$O | 0.6 |
| A-100 | 115.2 |

All of the above ingredients except the A-100 were mixed in a mixing vessel at room temperature with agitation. Next, the total amount of the A-100 was added to the mixing vessel while vigorously stirring with a high speed air stirrer. Stirring was continued for about 15 seconds. The resulting product, a prefoam, was immediately poured into a mold and allowed to rise fully. The resulting product was recovered as a rigid polyurethane foam bun and allowed to cure for 1 week at about 25° C.

The rigid polyurethane foam bun produced was found to have a density of 2.07 lbs./ft.$^3$, an ASTM E-84 Tunnel flame spread value of 48, and a smoke value of 295, a humidity aging volume change of 8.0% after 7 days and 10.2% after 14 days at 158° F and 90% relative humidity.

EXAMPLE III

This example demonstrates the incorporation of the urea-modified resole-based polyol of Example I into a polyurethane foam composition which employs an organic polyisocyanate.

| Ingredients | Parts per 100 Parts |
| --- | --- |
| Polyol of Example I | 30 |
| BE-375 "Niax" Polyol | 35 |
| Fyrol 6 Polyol | 5 |
| Propylene glycol | 2.0 |
| Triethanolamine | 3.0 |
| F-11BB | 22.75 |
| Dimethylethylamine | 0.83 |
| H$_2$O | 0.6 |
| DC 193 | 1.0 |
| Mondur MR | 98.2 |

All of the above ingredients except the Mondur MR were mixed in a mixing vessel at room temperature with agitation. Next, the total amount of the Mondur MR was added to the mixing vessel while vigorously stirring with a high speed air stirrer. Stirring was continued for about 15 seconds. The resulting product, a prefoam, was immediately poured into a mold and allowed to rise fully. The resulting product was recovered as a rigid polyurethane foam bun and allowed to cure for 1 week at about 25° C.

The rigid polyurethane foam bun produced was found to have a density of 2.1 lbs./ft.$^3$, an ASTM E-84 Tunnel flame spread value of 74, and a smoke value of 296, a humidity aging volume change of 5.5% after 7 days and 7.2% after 14 days at 158° F and 90% relative humidity.

Mondur MR is a polymeric polyaryl-polyisocyanate prepared by phosgenation of aniline and formaldehyde in a mineral acid; the polyisocyanate having 31.5 to 32% active —NCO groups and a viscosity of about 200 cps. at 25° C.

It will be evident from the foregoing that various modifications can be made to this invention. I consider such modifications as being within the scope of my invention.

I claim:

1. A polyurethane foam composition prepared by a process which comprises reacting an organic polyisocyanate or a polyisocyanate prepolymer with a resin mixture comprising a first polyol formed by reacting an alkylene oxide with a resole, said resole being formed in the presence of an alkaline catalyst by the reaction of phenol, urea and aldehyde.

2. The polyurethane foam composition of claim 1 wherein the only polyol in said resin mixture is a urea-modified resole-based polyol present in an amount of from about 60 to about 90 parts per 100 parts of the resin mixture.

3. The polyurethane foam composition of claim 1 wherein said resin mixture comprises at least one additional polyol, at least one crosslinking agent and a catalyst.

4. The polyurethane foam composition of claim 1 wherein said resin mixture comprises a second polyol wherein said first and second polyols are present in a total amount of from about 60 to about 75 parts per 100 parts of the resin mixture.

5. The polyurethane foam composition of claim 3 wherein said second polyol is an aromatic amine polyol or an aromatic polyether polyol.

6. The polyurethane foam composition of claim 3 wherein said resin mixture comprises a third polyol which is a fire retardant polyol present in an amount of from about 1 to about 10 parts per 100 parts of the resin mixture.

7. The polyurethane foam composition of claim 1 wherein said resin mixture comprises a catalyst present in an amount of from about 0.6 to about 1.2 parts per 100 parts of the resin mixture.

8. The polyurethane foam composition of claim 1 wherein said resin mixture comprises a blowing agent present in an amount of from about 10 to about 30 parts per 100 parts of the resin mixture.

9. The polyurethane foam composition of claim 1 wherein said resin mixture comprises a surfactant present in an amount of from about 0.3 to about 3 parts per 100 parts of the resin mixture.

10. The polyurethane foam composition of claim 1 wherein the polyurethane foam composition has a —NCO/—OH index of from about 1.05 to about 1.2 parts —NCO per 1 part —OH.

11. The polyurethane foam composition of claim 1 in which said urea is present in an amount within a range of from about 0.1 to about 1.0 mole per mole of phenol.

12. The polyurethane foam composition of claim 1 in which said aldehyde is present in an amount of from within a range of from about 1.5 to about 8 moles per mole of phenol.

* * * * *